Figure 1:
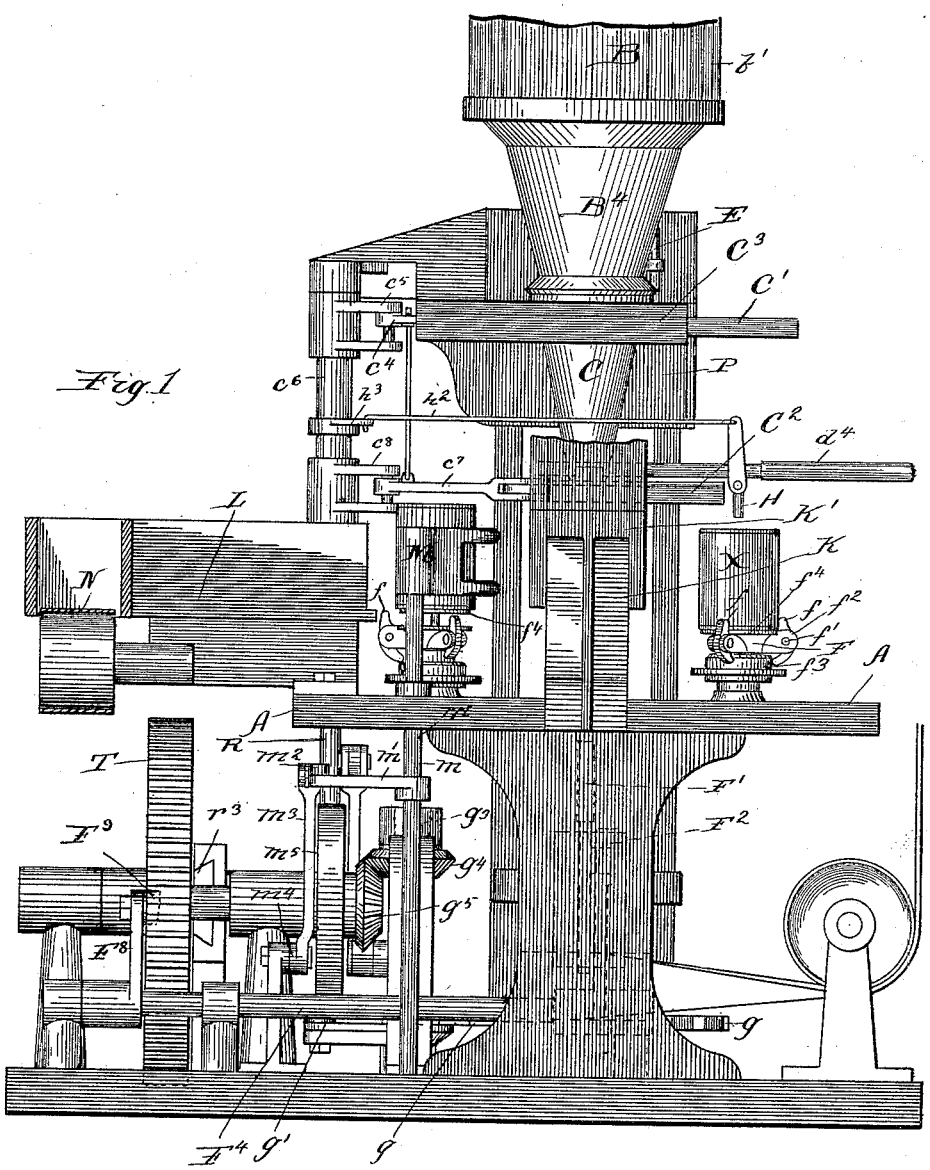

(No Model.) 8 Sheets—Sheet 1.

E. NORTON & J. G. HODGSON.
CAN FILLING MACHINE.

No. 458,639. Patented Sept. 1, 1891.

Witnesses:
Geo. E. Curtis
H. W. Munday

Inventors:
Edwin Norton
John G. Hodgson
By Munday, Evarts & Adcock,
their Attorneys.

(No Model.)  8 Sheets—Sheet 2.

E. NORTON & J. G. HODGSON.
CAN FILLING MACHINE.

No. 458,639.  Patented Sept. 1, 1891.

Witnesses:
Geo. C. Curtis
A. W. Munday

Inventors:
Edwin Norton
John G. Hodgson
By Munday, Evarts & Adcock,
their Attorneys.

(No Model.) 8 Sheets—Sheet 3.

E. NORTON & J. G. HODGSON.
CAN FILLING MACHINE.

No. 458,639. Patented Sept. 1, 1891.

Witnesses:
Geo. E. Curtis
H. M. Munday

Inventors:
Edwin Norton
John G. Hodgson
By Munday, Evarts & Adcock
their Attorneys.

(No Model.) 8 Sheets—Sheet 4.
E. NORTON & J. G. HODGSON.
CAN FILLING MACHINE.
No. 458,639. Patented Sept. 1, 1891.
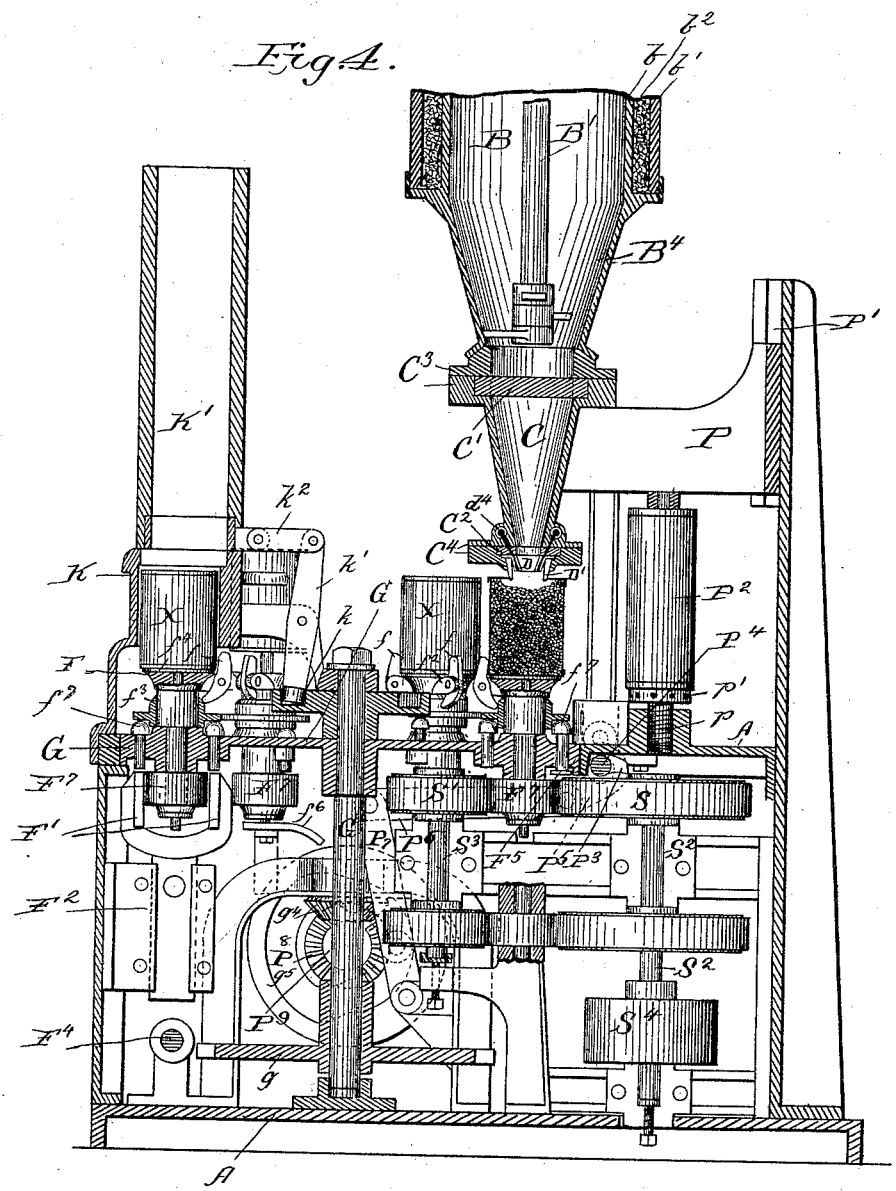
Witnesses:
Lew. E. Curtis
H. W. Munday
Inventors:
Edwin Norton
John G. Hodgson
By Munday, Evarts & Adcock
their Attorneys.
THE NORRIS PETERS CO., PHOTO-LITHO., WASHINGTON, D. C.

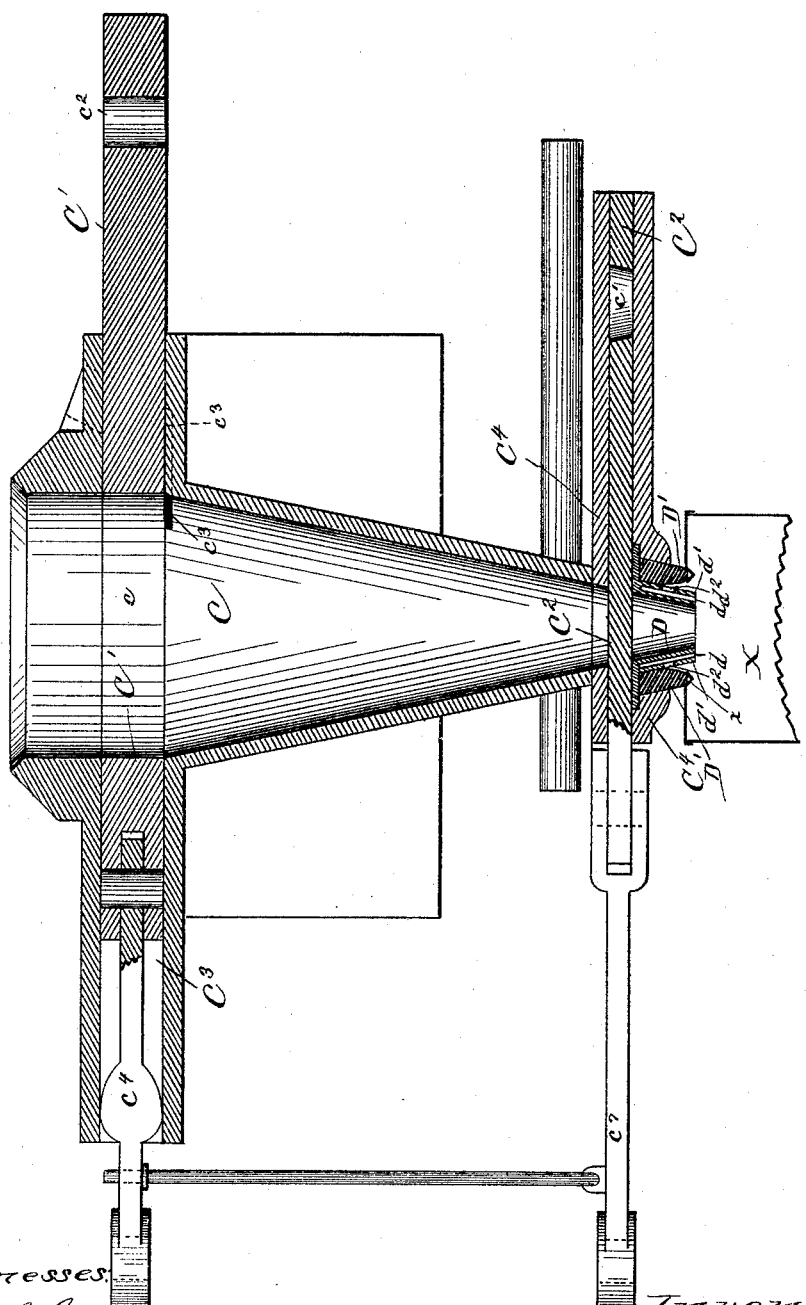

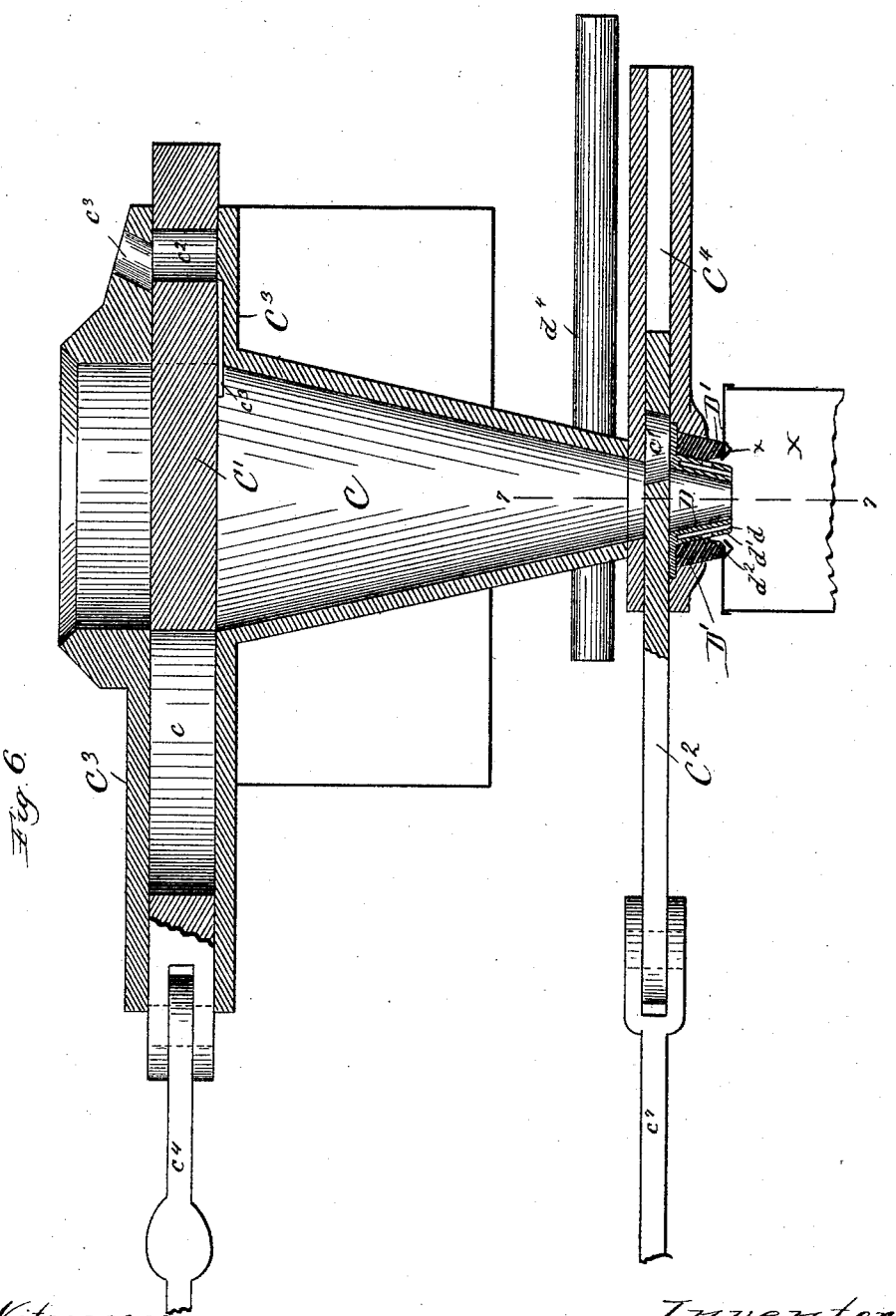

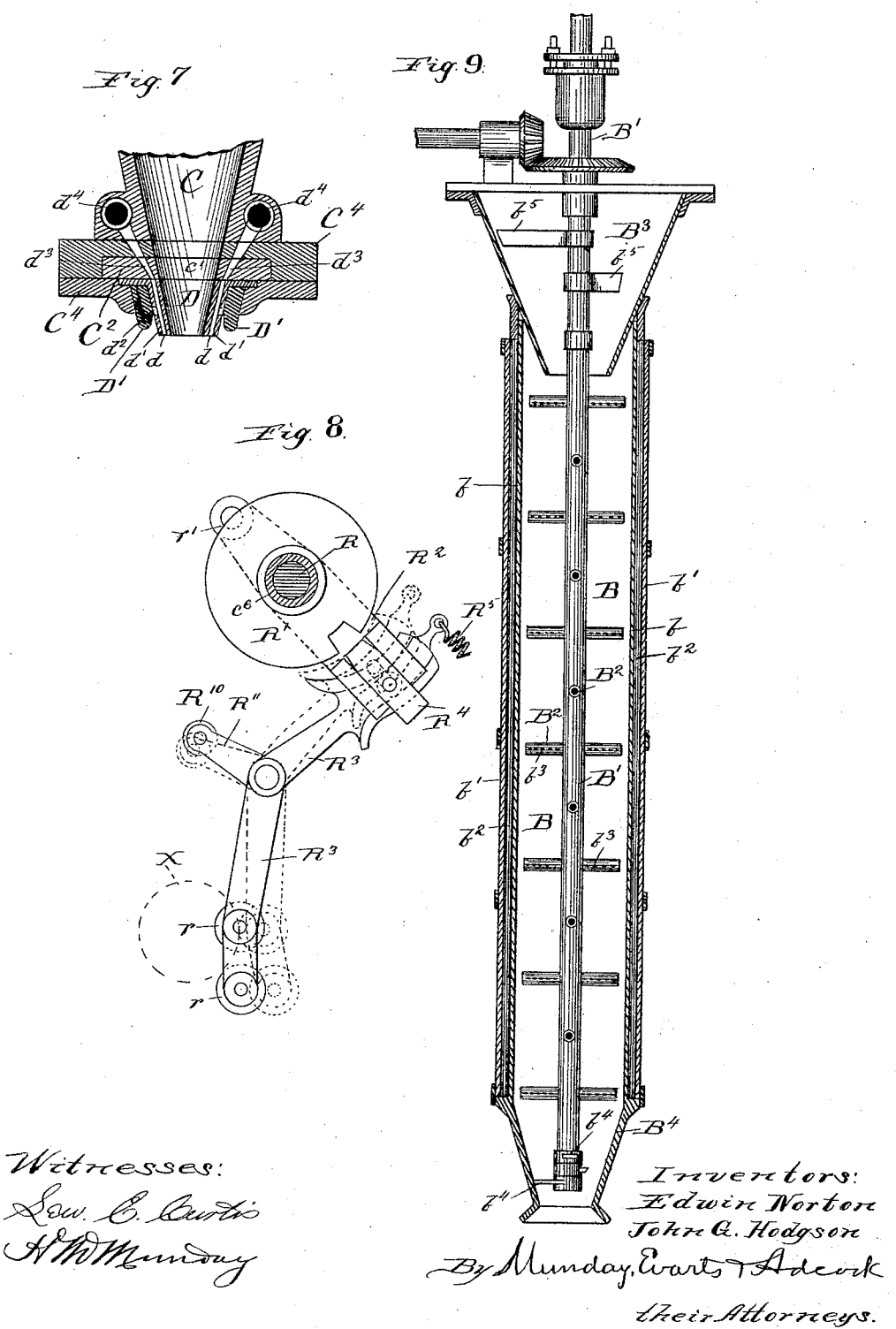

(No Model.) 8 Sheets—Sheet 8.
E. NORTON & J. G. HODGSON.
CAN FILLING MACHINE.
No. 458,639. Patented Sept. 1, 1891.
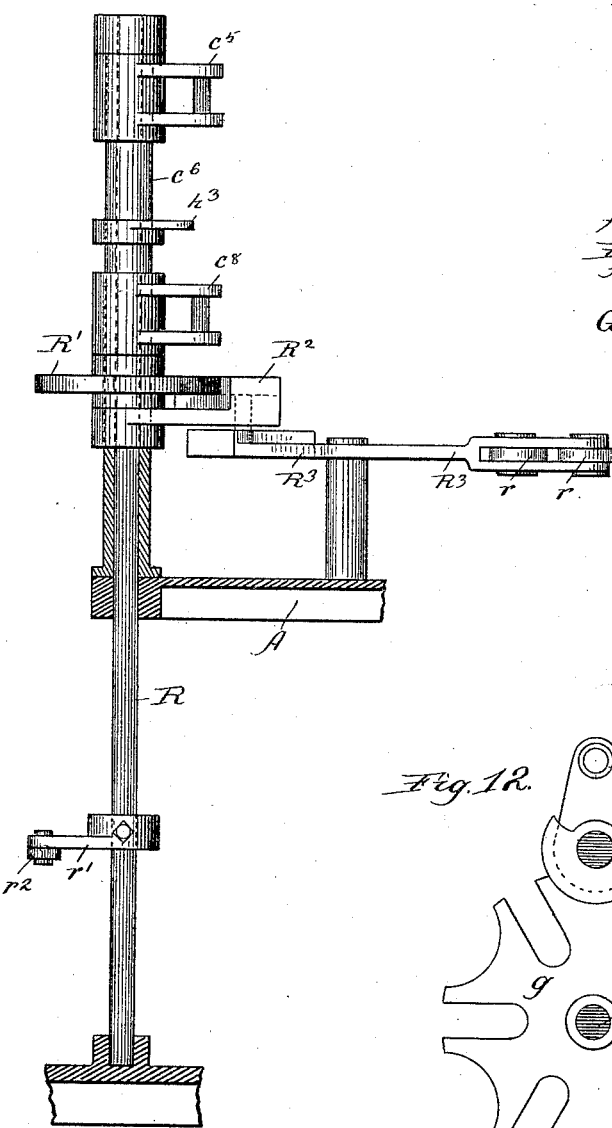
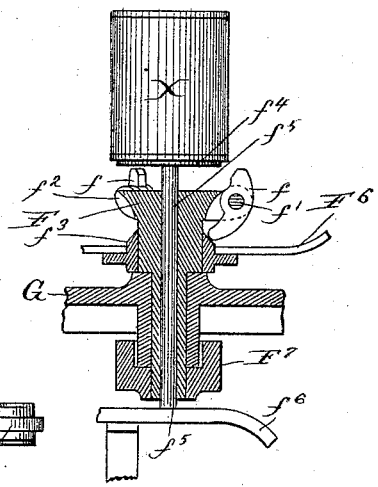
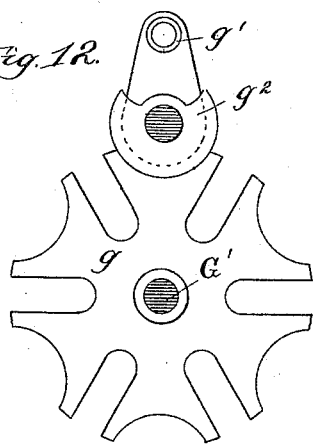
Witnesses:
Geo. E. Curtis
H. M. Munday
Inventors:
Edwin Norton
John G. Hodgson
By Munday, Evarts & Adcock
Their Attorneys.

UNITED STATES PATENT OFFICE.

EDWIN NORTON AND JOHN G. HODGSON, OF MAYWOOD, ASSIGNORS TO SAID NORTON AND OLIVER W. NORTON, OF CHICAGO, ILLINOIS.

CAN-FILLING MACHINE.

SPECIFICATION forming part of Letters Patent No. 458,639, dated September 1, 1891.

Application filed October 4, 1890. Serial No. 367,086. (No model.)

*To all whom it may concern:*

Be it known that we, EDWIN NORTON and JOHN G. HODGSON, citizens of the United States, residing in Maywood, in the county of Cook and State of Illinois, have invented a new and useful Improvement in Can-Filling Machines, of which the following is a specification.

Our invention relates to apparatus for cooking or partially cooking corn or other similar substances and automatically filling cans with the same.

In canning or preserving green corn in the method now generally in use and commonly known as the "hot process" the corn is first partially cooked, then pressed into the can in a hot and steaming condition. The can is then hermetically sealed and afterward cooked in a retort for a certain definite period of time, during which the retort is maintained at a fixed temperature. The time given for the cooking in the retort is based upon the supposition that all the corn at the time it is put into the cans is at a fixed temperature of, say, 200° Fahrenheit, and has all received a certain amount of preliminary cooking. In the practical operation of the process great loss and difficulty arise from the fact that the corn, unless uniformly cooked, will ferment and sour and swell the can, and that no adequate means have heretofore been provided for uniformly filling the cans with partially-cooked corn at a uniform or fixed temperature. In all the apparatus hitherto in use for this purpose the arrangements for filling the can from what is termed the "cooker" are so crude and imperfect that the cans are unequally filled—that is, some are overfilled, so that the corn will boil out when the can is removed from the machine, owing to the compressed air or steam in the corn, and some are underfilled, requiring an additional amount of corn to be placed in the cans. This unequal filling not only requires the services of men or women to equalize or remove some of the corn from some of the cans and to put corn into others, in order to insure an approximately uniform filling of the cans, but it also causes a difference of temperature in the cans at the time they are placed in the retort, or a difference of temperature in their contents. This arises from the fact that the surplus corn which boils over as the cans are filled from the cooker is used for this purpose, and is consequently of a different temperature from that which goes directly into the can from the cooker. Owing to this difference in temperature in the cans or in their contents when the cans are sealed up and subjected to the second cooking in the retort for a fixed and given time, it frequently happens that the second cooking does not uniformly cook the contents, or sufficiently to kill all the germs, so that fermentation will take place in some of the cans, creating a large percentage of loss. In the apparatus hitherto in use for filling the cans with corn, also, owing to the fact that the corn is forced into the can under great pressure and at a high temperature, more or less steam or air is carried into the can with the corn, so that as soon as the can is removed from the filler reaction takes place, which causes the corn and the milk contained in the can to boil out on the top of the can. This exudation being of a starchy nature must be entirely removed before perfect soldering of the cap on the can can be effected. As this exudation is of a very sticky or gummy nature, it is very difficult to remove it cleanly, and a great percentage of leaks and consequent loss is due to the imperfect cleaning of the cans, to say nothing of the labor and expense involved in the cleaning operation. It also frequently happens that the sides of the can are smeared with this starchy gluey liquid which requires to be removed before the cans are in marketable condition or appearance.

It is the object of our invention to provide an apparatus of a simple, efficient, and durable construction by which the preliminary or partial cooking may be uniformly effected and by which the cans may be uniformly filled rapidly and automatically with the partially-cooked corn at a fixed temperature and without causing or permitting any portion of the contents of the can to boil over or out, so as to smear the surface of the tin and interfere with the subsequent soldering operation and at the same time deliver the corn directly from the cooker into the can at the proper temperature.

Our invention consists, primarily, in the means we employ to accomplish this result— that is to say, in the combination, with a cooker having a measuring-chamber and discharge-nozzle, whereby a determinate quantity of corn may be delivered into each can, of a rotary can-holder for supporting and rotating the can rapidly while the corn is delivered into it from the cooker, so that the corn may be packed by centrifugal action in the can around its walls and the steam or compressed air or gases mixed with the corn separated by this centrifugal action from the corn and allowed to escape. By thus separating the confined steam or air from the mass of corn by centrifugal action as the corn is packed in the can all tendency for the corn or its juices to boil over or out of the can is entirely obviated and at the same time each can is filled snugly and uniformly full directly from the cooker, so that no additional corn is required to be placed in any of the cans or any to be removed from them. By this centrifugal action we also are enabled to pack the corn snugly against the walls and upper head of the can and also to leave a slight cavity or vacancy directly under or surrounding the cap-groove in the can-head, which materially facilitates the soldering operation and insures the perfect soldering of each and every can. Our invention also consists in the novel devices and novel combinations of parts and devices herein shown and described, and more particularly pointed out in the claims.

Figure 2:
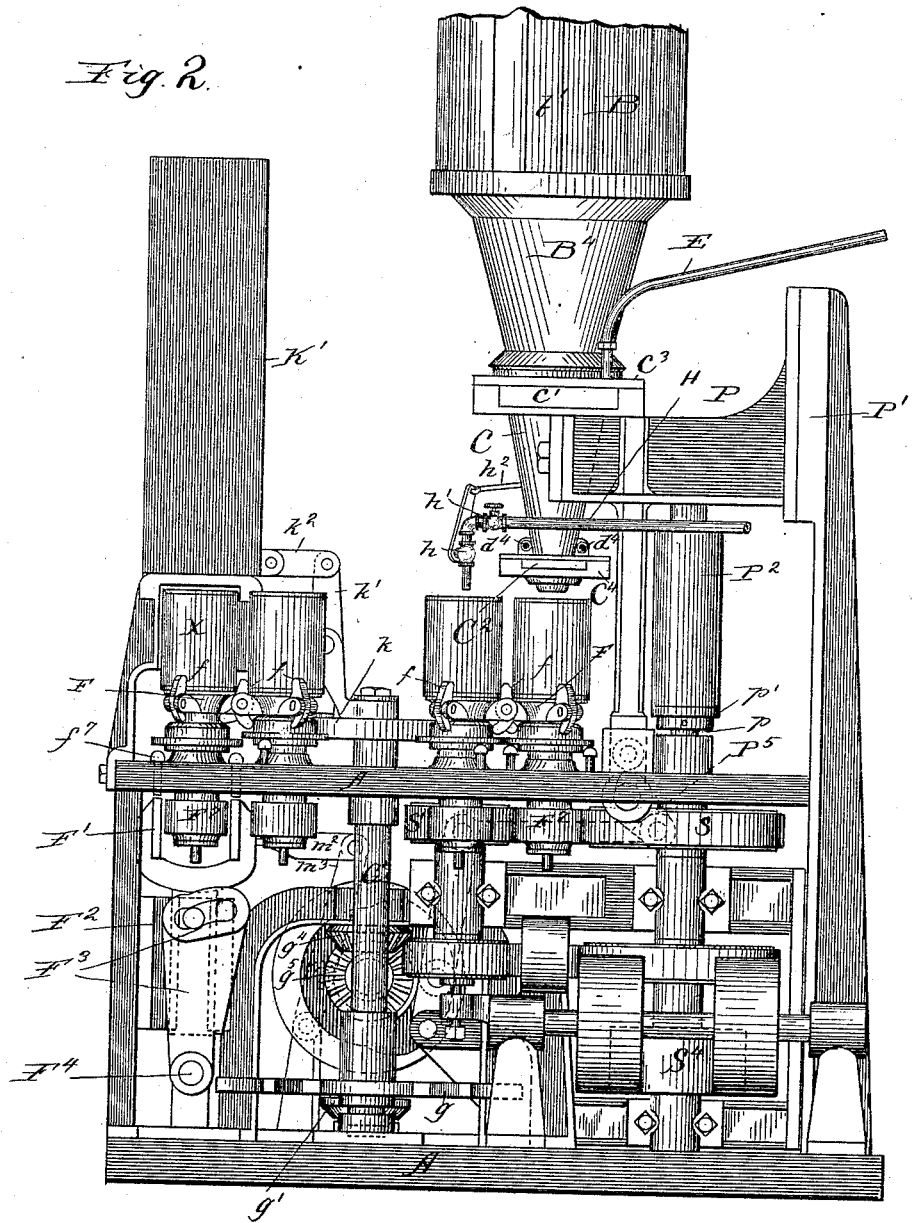
Figure 3:
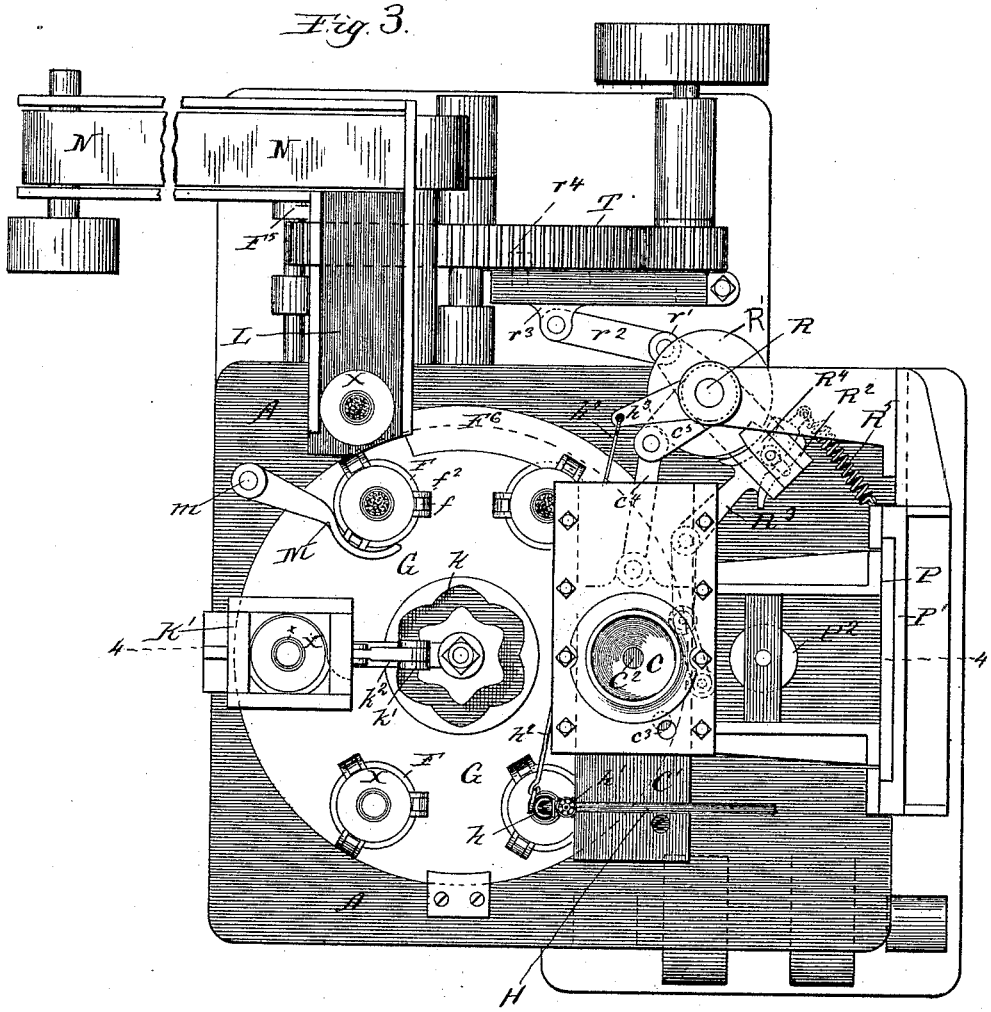

In the accompanying drawings, which form a part of this specification, and in which similar letters of reference indicate like parts in all the figures, Figure 1 is a front view of a machine or apparatus embodying our invention. Fig. 2 is a side elevation. Fig. 3 is a plan view. Fig. 4 is a vertical section taken on line 4 4 of Fig. 3. Figs. 5 and 6 are enlarged detail views of the measuring-chamber and its valves. Fig. 7 is a vertical sectional view of the discharge-nozzle, the same being taken on line 7 7 of Fig. 6. Fig. 8 is a detail view of the automatic mechanism for controlling the operation of the valves by the presence or absence of a can in the carrier. Fig. 9 is a detail vertical sectional view of the cooker. Fig. 10 is a detail view of the mechanism for operating the valves. Fig. 11 is a detail sectional view showing one of the rotary can-holders, and Fig. 12 is a detail plan view of the Geneva gear-movement by which an intermittent motion is communicated to the can-carrier and the same locked in position.

In the drawings, A represents the frame of the machine, which may be of any suitable form or construction.

B represents the cooker, having the usual inner metallic shell $b$ and outer wooden shell $b'$, with a felt or insulating packing $b^2$ between. It is also provided with the revolving steam-pipe or hollow shaft B', furnished with hollow arms or stirrers B², said pipe and arms having perforations $b^3$ to permit the escape of the hot steam into the mass of corn in the cooker. B³ is the hopper, into which the corn is delivered.

B⁴ is the conical or tapering end piece of the cooker, to which the measuring-chamber C is attached, and which forms a continuation of the cooker. The measuring-chamber C is preferably, also, of a conical or tapering shape and constitutes a continuation of the tapering base-piece B⁴. The revolving hollow shaft or pipe B' is provided with a number of stirrer plates or arms $b^4$ near its lower end, which bear against the inner wall of the base-piece B⁴, and thus serve to steady or keep the shaft B' in position in the cooker. Similar arms $b^5$ are also provided near the upper end of the shaft in the hopper B³. The measuring-chamber C is furnished with two valves C' C², one at its upper end and one at its lower end. These valves operate alternately—that is to say, the lower one being closed and the chamber filled with corn, the upper one is then closed, thus shutting off the supply of corn from the cooker and leaving a measured quantity in the measuring-chamber C. The lower valve is then opened and the measured quantity of corn discharged into the can. These valves may be of any suitable construction, and any suitable mechanism may be employed for giving them their required movements. We prefer, however, to make both these valves in the form of reciprocating slides or plates, mounted in suitable guide boxes or ways C³ C⁴, and having holes or openings $c$ $c'$, through which the corn is discharged.

Any suitable means or device may be employed in practicing our invention for forcing the corn out of the measuring-chamber C through the discharge-nozzle D into the can. The means which we prefer to employ for this purpose, however, consists in a pipe E, through which compressed air or steam may be admitted into the measuring-chamber at or near the top thereof, while the same is closed by the valve C'. The pipe E communicates with a reservoir or source of supply of compressed air or steam, which is not shown in the drawings, as the same may be any ordinary steam-pipe, air-pump, or other suitable device. To open and close the air or steam pipe or passage E, any suitable valve may be employed. It simplifies the construction of the apparatus, however, as well as its operation, to utilize the valve C' for this purpose. To this end we furnish the valve C' with an opening $c^2$, which communicates with the pipe E and a duct or passage $c^3$ in the box or guide C³, in which the valve C' reciprocates. The openings $c$ and $c^2$ in the valve C are so located or arranged that the communication between the measuring-chamber and the cooker is closed when communication between the measuring-chamber and the air or steam pipe E is opened. The air or steam passage is also cut off by the valve C' when said valve is opened to permit the discharge of corn from the cooker into the measuring-chamber. The filling-nozzle D is secured to the block or guide-plate $C^4$, in which the lower valve $C^2$ reciprocates. It is made double with an air-passage $d$ between its inner and outer walls. The outer shell or wall $d'$ of the nozzle has holes or perforations $d^2$ through it for the escape of air or steam from the can. The air-passage $d$ also has an exit opening or passage $d^3$ extending through the valve $C^2$ and the box or guide-block $C^4$, in which the valve $C^2$ reciprocates. Connecting with this passage $d$ are drain-pipes $d^4$ for carrying away any liquid which may be forced out with the steam or air from the can during the operation of filling the can. The filling-nozzle D is further provided with an elastic or rubber packing-ring D', adapted to fit in or about the cap-groove $x$ of the can X for the purpose of keeping the cap-groove clean and preventing any escape of liquid from the can during the filling operation. This rubber packing-ring D' is made of a wedging conical shape, and is firmly clamped in place between the nozzle D and its socket in the box or guide-plate $C^4$.

F represents the rotary can holder or support in or upon which the cans are held and by which they are rapidly revolved during the filling operation, so as by centrifugal action to separate the corn from the steam and air and pack it snugly in the can as it is delivered into the can through the nozzle D from the measuring-chamber C. This can-holder is or may be of any suitable construction adapted to support and rotate the can and hold it in position under the discharge-nozzle. The construction of rotary can-holder which we prefer to use, however, consists in a revolving head or disk F, furnished with opening and closing jaws or clamps $f$, adapted to grasp the can at or near its lower end. The number of these dogs or clamps $f$ on the rotary can-holder may be varied. As shown in the drawings, we employ three pivoted at $f'$ to ears or brackets $f^2$ on the rotary holder, so that they may be conveniently opened and closed by a sliding cam-ring or conical sleeve $f^3$, surrounding the holder F. To facilitate the lateral discharge of the filled can from the holder, we provide, or prefer to provide, the rotary holder with a supplemental top plate or disk $f^4$, by which the can-body may be lifted above the jaws or clamps $f$ at the time the can is to be discharged from the holder, as is clearly indicated in Fig. 11 of the drawings. The supplemental disk $f^4$ may be lifted by a pin $f^5$, to which it is attached, engaging a stationary cam $f^6$ on the frame of the machine as the holder F is moved by the carrier G, on which it is mounted. Any suitable form of moving carrier may be employed for moving the cans into position under the filling-nozzle D. A convenient form of carrier and that which we prefer to employ consists of a rotary table, as shown in the drawings.

In preserving or canning corn it is customary and desirable to deposit in each can a measured quantity of brine or other liquid, and for this purpose we provide our machine with a pipe H, having a valve $h$ and a regulating-valve $h'$, so that a measured quantity of brine, sirup, or other liquid may be fed into each can as it is carried around on the carrier G before or after it is delivered into position for filling under the nozzle D. By opening the valve $h$ a definite period of time for each can and by adjusting the valve $h'$ any desired quantity of liquid may be automatically delivered into each can.

K represents a passage or chute through or by which the empty cans are delivered to the holders F on the carrier G. The feed chute or passage K has a movable section K', which may be moved slightly out of register with the lower section K automatically at each intermittent movement of the can-carrier G, so that the cans X will be automatically delivered one by one to the carrier G, as required. Any suitable mechanism may be employed for giving this slight movement to the upper section K' of the can-body chute or passage. That which we prefer to employ consists, however, in a cam $k$, lever $k'$, and link $k^2$.

L represents the discharge-chute into which the cans are automatically discharged from the holder by a movable discharging arm or lever M, which is pivoted to the frame at $m$. As the cans are pushed along discharge chute or passage L by the arm M they are delivered upon a moving belt or carrier N, extending, preferably, transverse to the chute L.

The filling-nozzle D and the measuring-chamber C, to which it is attached, are reciprocated up and down to insert the end of the nozzle through the cap-opening of the can when the can is brought into position by the carrier by means of a slide P, which reciprocates up and down in suitable guides P' on the frame of the machine. An adjustable stop $P^2$ limits the downward movement and relieves the can from any undue weight or pressure. This adjustable stop is furnished with an adjusting screw and nut $p\ p'$. To avoid the necessity of a packed joint between the cooker or gun B and the measuring chamber or nozzle, we find it to be a convenient construction to connect the cooker B rigidly with the measuring-chamber, so that it may move up and down therewith. The slide P is automatically actuated, as required, by means of a cam $P^3$ on the rock-shaft $P^4$, arm $P^5$, link $P^6$, lever $P^7$, and cam $P^8$ on the shaft $P^9$.

The valve C' is operated by a link $c^4$, pivoted to the arm $c^5$ on the sleeve $c^6$. The valve $C^2$ is operated by a link $c^7$, pivoted to the arm $c^8$ on the sleeve $c^6$. The valve $h$ in the liquid-supply pipe is operated by a link $h^2$, connected to an arm $h^3$ on the sleeve $c^6$. Motion is communicated to the sleeve $c^6$ from the shaft R through a clutch, the parts of which are actuated or caused to engage by the can in the holder on the carrier if the can is present therein. Otherwise the parts of the clutch are not engaged, so that the valves are not operated unless a can is present in the holder to receive the discharge. This clutch mechanism may be of any suitable construction. It, however, preferably consists of a clutch-disk $R'$, fast upon the sleeve $c^6$, and a clutch-lever $R^2$, fast upon the shaft R and carrying a dog $R^4$, which may be brought into engagement with a notch $R^8$ in the clutch-disk $R'$ when a can is present in the holder. A lever $R^3$, which engages and is actuated by the can, operates the dog $R^4$ on said clutch-lever $R^2$, the dog sliding on the clutch-lever and having a pin $R^6$, which fits in a slot $R^7$ on said lever $R^3$. The slot $R^7$ is concentric with the clutch-disk $R'$ when the lever $R^3$ is in position to hold the dog $R^4$ in engagement with the notch $R^8$ in the clutch-disk $R'$, as is clearly shown in Fig. 8, so that the lever $R^3$ will not interfere with the oscillating movement of the lever $R^2$ and its dog $R^4$ with the clutch-disk $R'$ on said sleeve $c^6$. A spring $R^5$ normally holds the clutch-operating lever $R^3$ retracted. The opposite end of the clutch-lever $R^3$ carries a pair of friction-rollers $r$, which come in contact with the can X as it is revolved under the filling-nozzle. The shaft R is rocked by an arm $r'$ thereon, connected by a link $r^2$ with a slide $r^3$, which is actuated by a cam $r^4$ in the gear T. The dogs or clamps $f$ of the can-holder through the medium of their actuating cam-ring $f^3$ are operated by means of pins $f^7$ in the carrier G, which are raised or lifted by a pusher device $F'$, which is reciprocated in the guides $F^2$ on the frame of the machine by means of a cam $F^3$ on the shaft $F^4$. These pins, or one of them, is held in its lifted position by means of a stationary track or cam $F^5$ on the frame of the machine, which extends around to the can-discharging point of the machine. Another track or cam $F^6$, located above the lifter-ring $f^3$, serves to push the lifter-ring down, so that the dogs or clamps $f$ may open. Another stationary cam $f^6$ on the frame of the machine serves to lift the supplemental plate $f^4$ at the can-discharging point of the machine, so as to automatically raise the can above the upper ends of the dogs or clamps $f$. The can-holder F is revolved rapidly while the corn is being delivered into the can by means of a friction gear or wheel $F^7$ on the shaft of the revolving can-holder, which comes between and in contact with friction-wheels S S' on the shafts $S^2$ $S^3$. Revolving motion is communicated to the shaft $S^2$ in any suitable manner, preferably by a belt which runs upon the pulley $S^4$. An intermittent revolving motion is communicated to the can-carrier G in any suitable manner, but preferably by a Geneva stop-gear mechanism $g\ g'\ g^2$, the construction and operation of which are well known to those skilled in the art. The clutch lever or arm $R^3$ is or should be provided with a branch or arm $R^{11}$, carrying a friction-roller $R^{10}$ to engage the can in its succeeding position to return the lever to place in case the spring $R^5$ should fail to operate the lever.

We claim—

1. In a can-filling machine, the combination, with a containing-vessel for delivering the material to the can, of a can-holder mounted to rotate about its own axis, and means for rotating said can-holder while it is being filled, substantially as specified.

2. In a can-filling machine, the combination, with a corn-cooker communicating therewith, of a discharge-nozzle and a rotating or axially-revolving can-holder for supporting and revolving the can on its own axis as it is filled, whereby the corn by centrifugal action is separated from its intermixed air, gas, or steam and packed snugly in the can and against the walls thereof, substantially as specified.

3. The combination, with an axially-rotating can-holder, of a measuring-chamber having a discharge opening or nozzle for delivering the material in measured quantities into the can as it rotates, substantially as specified.

4. In a can-filling machine, the combination, with a cooker, a discharge nozzle or opening communicating therewith, an intermittently-moving can-carrier, and a series of axially-rotary can-holders mounted on said carrier, of means for rotating the cans and their holders on their own axes as they are separately filled from said cooker, substantially as specified.

5. The combination, with a measuring-chamber constructed and adapted to receive the hot material directly from the cooking device and provided with a discharge-nozzle, of a can-carrier and a series of axially-rotatable can-holders mounted on said carrier, substantially as specified.

6. In a can-filling machine, the combination, with a measuring-chamber corresponding in size to the can to be filled and provided with an inlet-valve and an outlet-valve, of a pipe E for admitting compressed air or steam into said measuring-chamber to force out the contents thereof into the can, and a rotary can-holder for holding and revolving the can on its own axis as it is filled, and thereby separating the air, gas, or steam from the solid contents and packing the latter solidly against the walls of the can, substantially as specified.

7. In a can-filling machine, the combination, with a measuring-chamber corresponding in size to the can to be filled and provided with an inlet-valve and an outlet-valve, of a pipe E for admitting compressed air or steam into said measuring-chamber to force out the contents thereof into the can, a can-carrier, and a series of axially-rotating can-holders mounted thereon for successively presenting the cans to the outlet of said measuring-chamber and rotating them on their axes as they are filled, substantially as specified.

8. In a can-filling machine, the combination, with a measuring-chamber corresponding in size to the can to be filled, a cooker communicating with said measuring-chamber, an inlet-valve for closing the opening or passage between the measuring-chamber and the cooker, an outlet-valve for closing the discharge-orifice for said measuring-chamber, a can-holder, and a pipe E for admitting compressed air or steam into said measuring-chamber to force out the contents thereof into the can, said can-holder having a rotary movement on its own axis to axially revolve the can after it is filled, of means for revolving said holder, substantially as specified.

9. The combination of a measuring-chamber having an inlet and outlet valve with pipe E for admitting compressed air or steam into said measuring-chamber to force out the contents thereof, the inlet-valve of said measuring-chamber being furnished also with a valve opening or port for opening or closing communication with said pipe E, substantially as specified.

10. The combination, with a measuring-chamber C, of a capacity corresponding to that of the can to be filled, having valves C' and C², and a discharge-nozzle D, adapted to fit the cap-groove of the can and furnished with vent-passages for the escape of steam or air from the can, of a compressed air or steam pipe E for admitting compressed air or steam to said measuring-chamber, a rotary can-holder, and a cooker communicating with said measuring-chamber, substantially as specified.

11. The combination, with measuring-chamber C, having valves C' C², air or steam pipe E, communicating therewith, and discharging-nozzle D, furnished with vent-passages for the escape of steam or air from the can, of a can-carrier and a series of rotary can-holders mounted thereon, substantially as specified.

12. In a can-filling machine, the combination, with a measuring-chamber C, provided with inlet-valve C' and outlet-valve C², of a filling-nozzle D, having double walls with a passage between for the escape of air from the can, a pipe E for admitting compressed air or steam to said measuring-chamber to force the contents out of the same into the can, and a can-holder for supporting the can under the nozzle, substantially as specified.

13. The combination, with a can-holder, of a reciprocating measuring-chamber having a discharge-nozzle D attached thereto and reciprocating therewith, substantially as specified.

14. The combination, with a can-holder, of a reciprocating measuring-chamber having a discharge-nozzle D attached thereto and reciprocating therewith, said measuring-chamber having also a cooker attached thereto at its upper end, substantially as specified.

15. In a can-filling machine, the combination, with a reciprocating discharge-nozzle through which the can is filled, of a can-holder furnished with devices for embracing or clamping the can at its lower end and provided with a reciprocating plate or base for lifting the can above said clamping device, substantially as specified.

16. The combination, with a reciprocating discharge or filling nozzle, of an axially-rotating can-holder for rotating the can on its own axis as it is filled from said nozzle, and a measuring-chamber communicating with said nozzle, substantially as specified.

17. The combination, with a containing-vessel, of a nozzle D, furnished with an elastic packing-ring D', adapted to fit in the cap-groove of the can, and an auxiliary revolving can-holder for revolving the can on its own axis, substantially as specified.

18. The combination, with a containing-vessel, of a nozzle D, furnished with an elastic packing-ring D', adapted to fit in the cap-groove of the can, and an auxiliary revolving can-holder for revolving the can on its own axis, said nozzle having an air or vent passage through the same, substantially as specified.

19. The combination, with a can-carrier furnished with a series of can-holders F, provided with opening and closing jaws or dogs $f$, adapted to grasp the lower end or rim of the can, of a can-body feed-chute having a movable section or part for automatically delivering the cans one by one to said holder, substantially as specified.

20. The combination, with a can-carrier furnished with a series of can-holders F, provided with opening and closing jaws or dogs $f$, adapted to grasp the lower end or rim of the can, of a can-body feed-chute having a movable section or part for automatically delivering the cans one by one to said holder, a can-filling nozzle, and means for rotating said can-holders F as they are filled, substantially as specified.

21. The combination, with a can-carrier, of a series of can-holders F, mounted thereon and furnished with opening and closing jaws or dogs $f$, said jaws or dogs $f$ being adapted to grasp or clamp the can only at its lower end or rim, and means for automatically delivering the cans to said holders, substantially as specified.

22. The combination, with a can-carrier, of a series of can-holders F, mounted thereon and furnished with opening and closing jaws or dogs $f$, and a supplemental disk or plate $f^4$, fitting in or between said dogs and adapted to bear against the end of the can, whereby the cans may be moved out of said jaws or dogs, substantially as specified.

23. The combination, with a can-carrier, of a series of can-holders F, mounted thereon and furnished with opening and closing jaws or dogs $f$, a supplemental disk or plate $f^4$, fitting in or between said dogs and adapted to bear against the end of the can, whereby the cans may be moved out of said jaws or dogs, and a cam $f^6$ for lifting said plate, substantially as specified.

24. The combination, with a can-carrier, of a series of can-holders F, mounted thereon and adapted to receive and support the can on its end and furnished with opening and closing jaws or dogs $f$, a sliding cam-ring for closing said jaws, and means for operating said cam-ring, substantially as specified.

25. The combination, with a rotating can-carrier, of a series of can-holders F, mounted thereon and furnished with opening and closing jaws or dogs $f$, a sliding cam-ring for closing said jaws, and a track for supporting said cam-ring and holding said jaws closed as the carrier moves, said carrier being provided with pins $f^7$ to impinge against said track, substantially as specified.

26. The combination, with a rotating can-carrier, of a series of can-holders F, mounted thereon and furnished with opening and closing jaws or dogs $f$, a sliding cam-ring for closing said jaws, a track for supporting said cam-ring and holding said jaws closed as the carrier moves, and a second track for returning said cam-ring to place, said carrier being provided with pins $f^7$ to impinge against said first-mentioned track, substantially as specified.

27. The combination, with a can-carrier, of disk-shaped can-holders F, mounted thereon and adapted to support the can on end and furnished with opening and closing jaws or dogs $f$, pivoted thereto in position to engage the edge or rim only of the can, and means for operating said jaws or dogs $f$, substantially as specified.

28. The combination, with a can-carrier, of a series of can-holders F, mounted thereon and furnished with opening and closing jaws or dogs $f$, a containing-vessel, a filling-nozzle D, and mechanism for revolving said can-holders, substantially as specified.

29. The combination, with a can-carrier, of a series of can-holders F, mounted thereon and adapted to receive the cans on end and furnished with opening and closing jaws or dogs $f$, adapted to engage the end or rim of the can, a vertically-reciprocating supplemental disk or plate $f^4$, whereby the cans may be moved out of said jaws or dogs, means for operating said jaws or dogs, and a discharge-arm M, substantially as specified.

30. The combination, with a can-carrier, of a series of can-holders F, mounted thereon and adapted to receive the cans on end and furnished with opening and closing jaws or dogs $f$, adapted to engage the end or rim of the can, means for operating said jaws or dogs, a vertically-reciprocating supplemental disk or plate $f^4$, whereby the cans may be moved out of said jaws or dogs, a discharge-arm M, a discharge-chute, and a can-carrier belt N, substantially as specified.

31. The combination, with a containing-vessel and a filling-nozzle D, of an axially-rotating can-holder having a shaft furnished with a friction wheel or roller, and a friction-wheel engaging said first-mentioned wheel or roller for revolving the same, substantially as specified.

32. The combination, with a can-carrier furnished with a series of axially-rotating can-holders having shafts provided with friction-wheels, of a containing-vessel, a filling-nozzle D, and a driving-wheel S, engaging said friction-wheel when the can-holder is brought by the carrier into position for filling, substantially as specified.

33. The combination, with a can-carrier G, having rotary can-holders F mounted thereon and provided with friction-gears $F^7$, of a pair of friction-wheels S S′, between which the friction-wheels on said can-holders are brought by the carrier, substantially as specified.

34. The combination, with a measuring-chamber having inlet and outlet valves and a discharge opening or nozzle, of a rotary can-holder and a pipe E, communicating with said chamber for forcing the contents out of the same into the can by compressed air or steam, the revolution of the can-holder on its axis operating to separate the corn from the air or steam by centrifugal action and to pack the corn snugly in the can, said nozzle having an air passage or vent to permit the escape of air or steam from the can, substantially as specified.

EDWIN NORTON.
JOHN G. HODGSON.

Witnesses:
H. M. MUNDAY,
EMMA HACK.